(12) United States Patent
Beursken et al.

(10) Patent No.: US 10,189,560 B2
(45) Date of Patent: Jan. 29, 2019

(54) LANDING GEAR PLATFORM

(71) Applicant: The Boeing Company, Chicago, IL (US)

(72) Inventors: Erika Lee Beursken, Everett, WA (US); Andrea Le Ridgeway, Snohomish, WA (US); Christopher Kempf, Marysville, WA (US); Gregory Edward Olson, Sedro Woolley, WA (US); Michael Glen Nielson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 15/281,408

(22) Filed: Sep. 30, 2016

(65) Prior Publication Data
US 2018/0094445 A1    Apr. 5, 2018

(51) Int. Cl.
*B64C 25/00* (2006.01)
*B64F 5/00* (2017.01)

(52) U.S. Cl.
CPC .......... *B64C 25/001* (2013.01); *B64F 5/0009* (2013.01)

(58) Field of Classification Search
CPC ....... B60R 3/005; B60R 3/007; E01D 19/106; B64C 25/001; B64F 5/00; B64F 5/40

USPC .............................................. 182/150; 108/44
See application file for complete search history.

(56) References Cited

U.S. PATENT DOCUMENTS

| | | | | |
|---|---|---|---|---|
| 6,457,558 | B1* | 10/2002 | Ehnes | B25H 5/00 |
| | | | | 182/150 |
| 6,957,719 | B2* | 10/2005 | Ehnes | B25H 5/00 |
| | | | | 182/150 |
| 2010/0012431 | A1* | 1/2010 | Ehnes | B60R 3/007 |
| | | | | 182/150 |
| 2010/0122871 | A1* | 5/2010 | Gottlinger | B60R 3/007 |
| | | | | 182/106 |

* cited by examiner

*Primary Examiner* — Philip J Bonzell
(74) *Attorney, Agent, or Firm* — Joseph M. Rolnicki; Evans & Dixon, L.L.C.

(57) ABSTRACT

A landing gear platform is positionable between rearward and forward tires on one side of an aircraft landing gear and rearward and forward tires on the opposite side of the aircraft landing gear. The platform includes a pair of chocks that engage between the rearward and forward tires on the one side of the aircraft landing gear and the rearward and forward tires on the opposite side of the aircraft landing gear and prevent the tires from rotating. A panel spans over the tops of the pair of chocks. A top surface of the panel can be reached by a worker using a stepstool, enabling the worker to stand on the top surface of the panel when performing work on the landing gear above the rearward and forward tires of the aircraft landing gear.

20 Claims, 5 Drawing Sheets

LANDING GEAR PLATFORM

FIELD

This disclosure pertains to a landing gear platform that supports a worker on an aircraft landing gear when performing work on the landing gear.

BACKGROUND

During initial construction stages of an aircraft the aircraft is supported on jacks. The main landing gear of the aircraft are elevated by the jacks and do not bear any of the weight of the aircraft. This allows all of the main landing gear tires to spin freely.

Currently, mechanics and electricians working on the aircraft landing gear assemblies are exposed to awkward conditions while performing the work. The employees climb over free-spinning tires, hydraulic lines, and struts in order to access the work area located above the tires. The employees balance on the aircraft tires and struts while maneuvering over the hydraulic lines to access the work area above the main landing gear tires. Also, employees may place job supplies on the top of the free-spinning tires. These supplies can easily slide off, which may result in a spill.

SUMMARY

In one aspect, a landing gear platform is provided. The landing gear platform includes a chock and a panel. The chock is configured to fit and engage between a rearward tire of an aircraft landing gear and a forward tire of the aircraft landing gear. The chock has a top surface. The panel has a top surface and opposite bottom surface. The bottom surface of the panel is configured to be positioned over the top surface of the chock with the chock fit and engaged between the rearward tire of the aircraft landing gear and the forward tire of the aircraft landing gear, whereby the chock supports the top surface of the panel between the rearward tire and forward tire of the aircraft landing gear. The top surface is accessible to an individual and is configured to support the individual above the rearward tire and forward tire of the aircraft landing gear.

BRIEF DESCRIPTION OF THE DRAWINGS

Further features of the landing gear platform for supporting a worker on an aircraft landing gear that is the subject of this disclosure are set forth in the following detailed description and drawing figures.

DETAILED DESCRIPTION

Disclosed herein is a landing gear platform that supports a worker on an aircraft landing gear when performing work on the landing gear. More specifically, the herein described embodiments pertain to a landing gear platform that is positioned between and extends across rearward and forward tires on one side of the landing gear and rearward and forward tires on the opposite side of the landing gear. The platform includes a pair of chocks that engage between the rearward and forward tires on one side of the landing gear and the rearward and forward tires on the opposite side of the landing gear and prevent the tires from rotating. A panel spans over the tops of the pair of chocks. A top surface of the panel can be reached by a worker using a step stool, enabling the worker to stand on the top surface of the panel when performing work on the landing gear above the rearward and forward tires of the landing gear.

The landing gear platform of this disclosure reduces economic impact and eliminates safety concerns described earlier by providing a flat and stable work surface for employees to work on and place supplies.

The components of the landing gear platform include two chocks and a flat, rigid panel. Each chock is configured to fit between a rearward tire and a forward tire on the outboard side of the landing gear assembly and a rearward tire and a forward tire on the inboard side of the landing gear assembly. The chocks fitting between the tires prevent them from spinning freely, while providing a stable top surface for the panel to span across.

The panel has a non-skid top surface, and can be provided with a cutout section or notch to allow room for a hydraulic cylinder of the aircraft landing gear assembly. The peripheral edge of the panel is padded to protect the component parts of the aircraft landing gear assembly. The platform is lightweight, durable, easy to use, and can be installed by two people in a fraction of a minute.

Once the panel is installed on a landing gear assembly, an employee can use a step stool ladder to safely access the panel, and either kneel or stand on the top surface of the panel of the platform to perform work on the landing gear assembly.

The landing gear platform is a simple design and can be used to perform any work over the main landing gear tires in the factory, on the field, in the flight line, or by aircraft customers.

Figure 1:
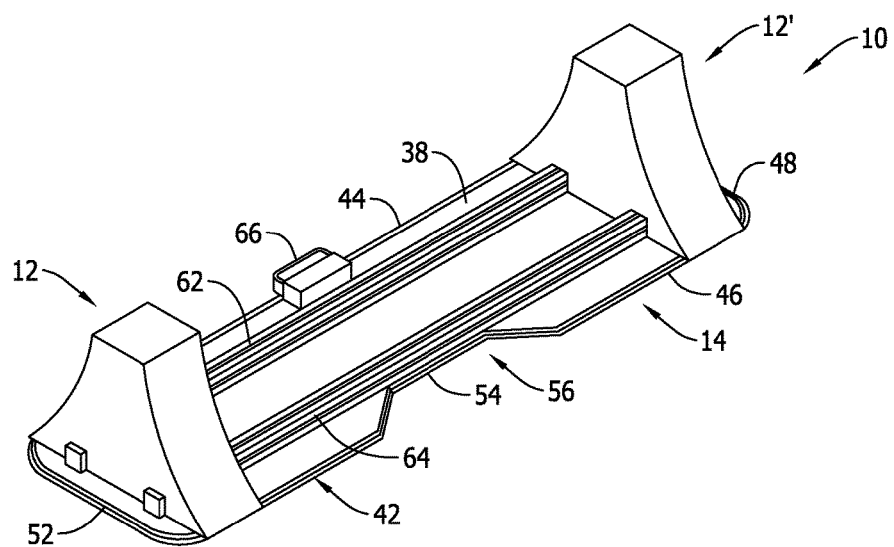
FIG. 1 is a representation of a perspective view of the bottom of the platform.
Figure 2:
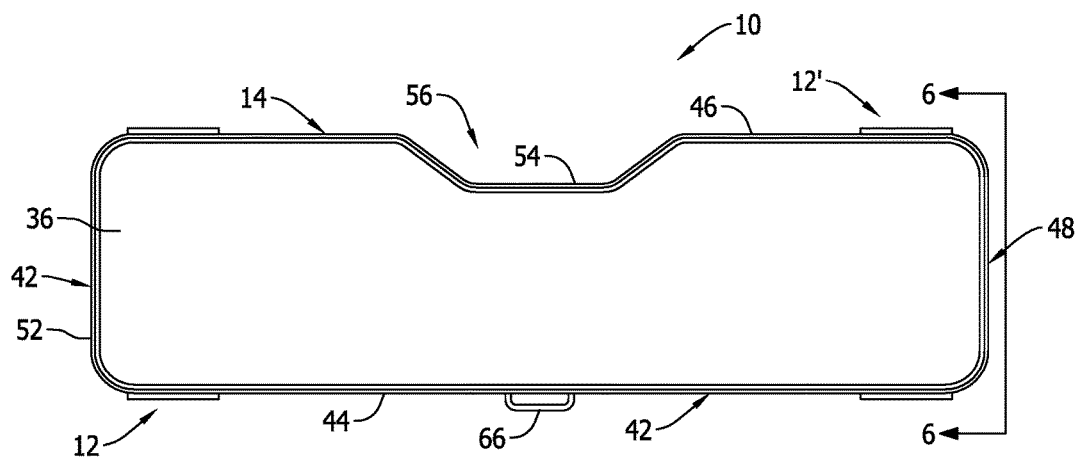
FIG. 2 is a representation of a plan view of the top of the platform.
Figure 3:
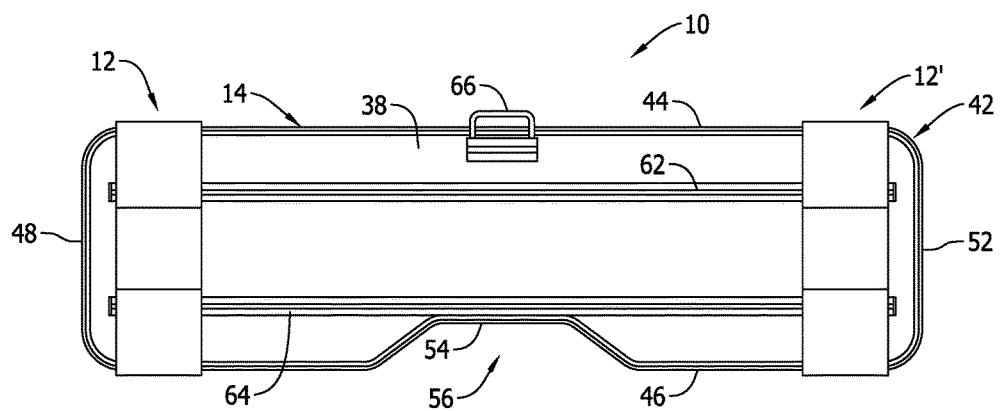
FIG. 3 is a representation of a plan view of the bottom of the platform.
Figure 4:
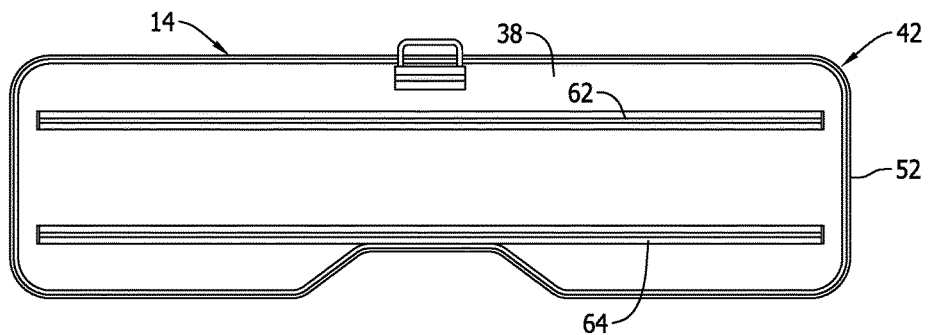
FIG. 4 is a representation of a plan view of the bottom of the platform with a pair of chocks removed from the panel of the platform.
Figure 5:
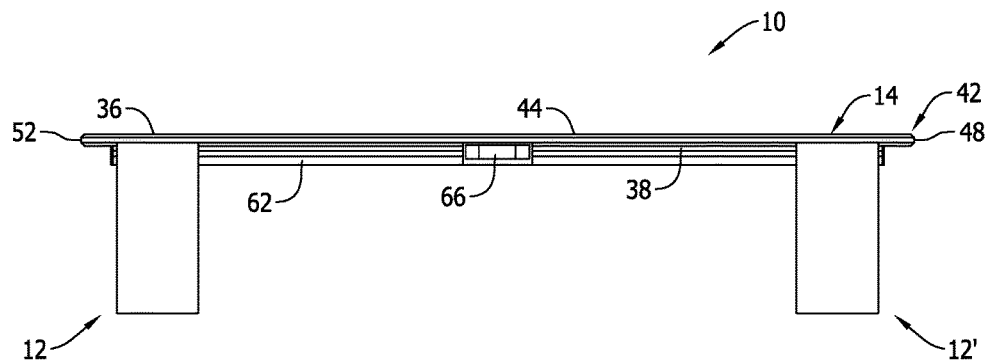
FIG. 5 is a representation of a front elevation view of the platform.

As stated above, FIG. 1 is a representation of a bottom perspective view of the platform 10 of this disclosure. The platform 10 is comprised of three component parts, a first chock 12, a second chock 12' and a panel 14. The first chock 12 and the second chock 12' have substantially the same constructions. Therefore, only the construction of the first chock 12 will be described in detail herein, with it being understood that the second chock 12' has substantially the same construction. The reference numbers employed in the description of the first chock 12 are also employed to label the structural features of the second chock 12', with the reference numbers labeling the features of the second chock 12' being follow by a prime ('). The first chock 12, the second chock 12' and the panel 14 are all separate component parts that can be easily assembled together as represented in FIG. 1 and disassembled without the need for tools.

The first chock 12 is constructed of a solid block of a resilient material, for example foam rubber or other equivalent materials. The resilient material of the first chock 12 is completely enclosed in a flexible layer of fluid impervious material, for example vinyl tape or other equivalent materials. The flexible layer of fluid impervious material protects the resilient material inside the first chock 12 from breaking apart and protects parts of the aircraft landing gear, such as the tires during use of the platform 10.

The first chock 12 has a general wedge shaped configuration. The first chock 12 has a rearward surface 16 or a first contact surface 16. The rearward surface 16 has a concave, curved configuration that matches or is complementary to the convex curvature of an aircraft landing gear tire. The rearward surface 16 is configured for engagement of the rearward surface 16 against a portion of a peripheral surface of a rearward tire of an aircraft landing gear.

The first chock 12 also has a forward surface or second contact surface 18 opposite the rearward surface 16. The forward surface 18 is substantially a mirror image of the rearward surface 16. The forward surface 18 has a concave, curved configuration that is configured for engagement of the forward surface 18 against a portion of a peripheral surface of a forward tire of an aircraft landing gear.

The first chock 12 also has an outboard surface 22. The outboard surface 22 is a flat surface that extends between the rearward surface 16 and the forward surface 18 and intersects the rearward surface 16 and the forward surface 18. The outboard surface 22 is positioned substantially perpendicular to the rearward surface 16 and the forward surface 18.

The first chock 12 also has an inboard surface 24 opposite the outboard surface 22. The inboard surface 24 is also a flat surface that extends between the rearward surface 16 and the forward surface 18 and intersects the rearward surface 16 and the forward surface 18. The inboard surface 24 and the outboard surface 22 are substantially parallel.

The first chock 12 also has a flat top surface 26. The top surface 26 extends between the rearward surface 16 and the forward surface 18 and intersects the rearward surface 16 and the forward surface 18.

Figure 7:
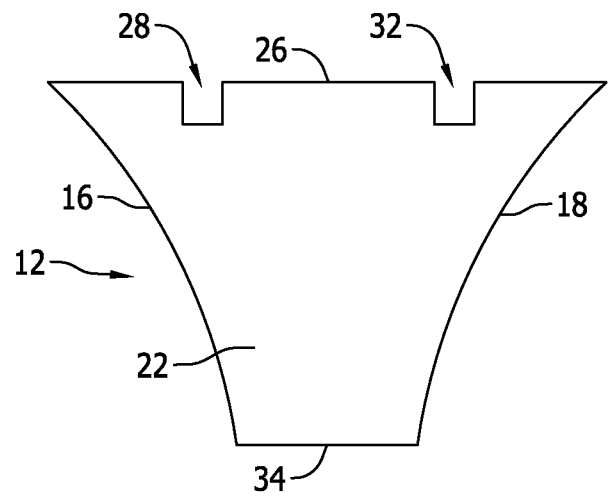
FIG. 7 is a representation of a side elevation view of a chock of the platform, with the opposite side elevation view being a mirror image thereof.
Figure 8:
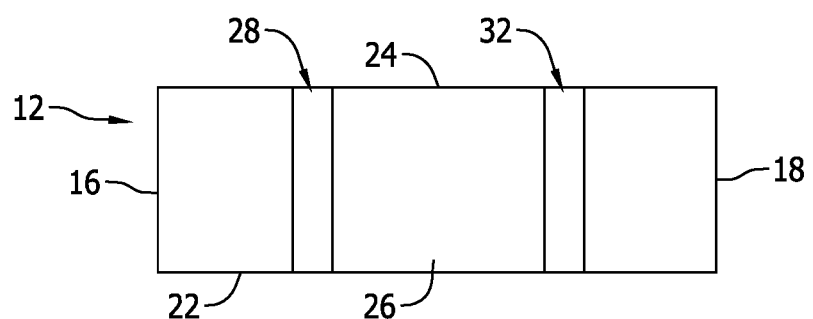
FIG. 8 is a representation of a top plan view of a chock of the platform.

A pair of channels 28, 32 are recessed into the top surface 26 of the first chock 12. As represented in FIG. 7, the channels 28, 32 have generally rectangular or square cross-section configurations. The channels 28, 32 could have other cross-section configurations. It is not necessary that the channels 28, 32 have the same cross-section configurations. The channels 28, 32 extend straight across the top surface 26 between the outboard surface 22 and the inboard surface 24 and intersect with the outboard surface 22 and the inboard surface 24. The pair of channels 28, 32 are parallel with each other and are parallel with the rearward surface 16 and the forward surface 18.

The first chock 12 also has a flat bottom surface 34 opposite the top surface 26. The bottom surface 34 extends between the rearward surface 16 and the forward surface 18 and intersects the rearward surface 16 and the forward surface 18. The bottom surface 34 and the top surface 26 are substantially parallel.

In alternative constructions, the first chock 12 and second chock 12' could be inflatable, or could be spring loaded, or have adjustable configurations. The top surfaces 26, 26' and the bottom surfaces 34, 34' of the respective chocks 12, 12' could be closer to each other than that represented in the drawing figures, or could be farther apart from each other than that represented in the drawing figures. Additionally, the chocks 12, 12' could have hollow constructions and could be constructed to rotomold, or three-dimensional additive manufacturing methods, or by CNC milling manufacturing methods.

The panel 14 is constructed of a rigid material, for example a wood board, a composite material or other equivalent materials. The panel 14 has a flat top surface 36. The top surface 36 could be covered with a non-slip material. The panel 14 also has a flat bottom surface 38 opposite the top surface 36. The top surface 36 and the bottom surface 38 are substantially parallel. The panel 14 has a peripheral edge 42 that extends completely around the panel 14 and gives the panel 14 a generally rectangular configuration. The peripheral edge 42 is comprised of a rearward edge portion 44, an opposite forward edge portion 46, an outboard edge portion 48, and an opposite inboard edge portion 52. The rearward edge portion 44, the outboard edge portion 48, and the inboard edge portion 52 are all substantially straight. The forward edge portion 46 has a central portion 54 that is indented into the panel 14. The central portion 54 forms a notch 56 in the forward edge portion 46 of the panel 14. The entire peripheral edge 42 of the panel 14 is covered with a resilient, cushioning material. The cushioning material protects parts of the aircraft landing gear during use of the platform 10.

A pair of rails 62, 64 are securely attached to the bottom surface 38 of the panel 14. The rails 62, 64 are substantially identical to each other. However, it is not necessary that the rails 62, 64 be identical. The rails 62, 64 are spaced from each other and extend straight across the bottom surface 38 of the panel 14 between the outboard peripheral edge portion 48 and the inboard peripheral edge portion 52 of the panel 14. The rails 62, 64 have cross-section configurations that match and are complementary to the cross-section configurations of the respective first channels 28, 28' and second channels 32, 32' of the first chock 12 and the second chock 12'. Additionally, the rails 62, 64 are spaced from each other by a distance that corresponds to the distance between the channels 28, 28', 32, 32' of the first chock 12 and second chock 12'.

A handle 66 is provided on the rearward edge portion 44 of the panel 14 opposite the notch 56. The handle 66 is configured to be manually grasped for transporting the panel 14 and for positioning the panel at a desired location.

Figure 9:
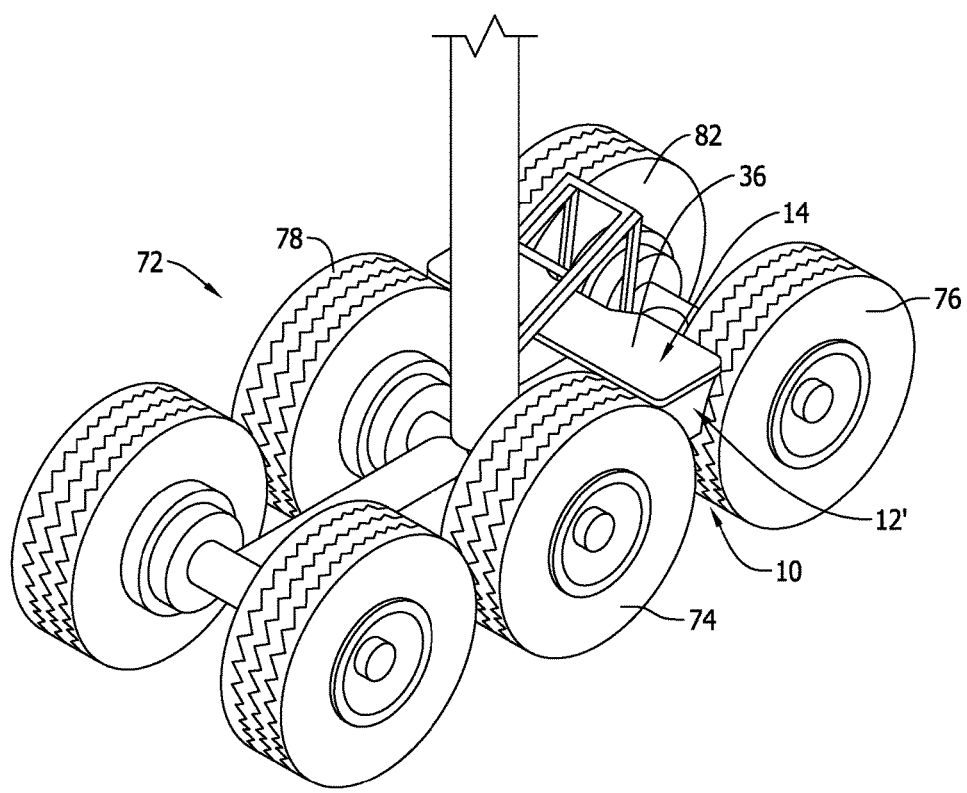
FIG. 9 is a representation of a method of using the platform on an aircraft landing gear.

The method of using the platform 10 of this disclosure with a landing gear assembly 72 is represented in FIG. 9. In use of the platform 10, the first chock 12 is first manually positioned between a first, rearward tire 74 of the landing gear assembly 72 and a first, forward tire 76 of the landing gear assembly. As represented in FIG. 9, the rearward surface 16 of the first chock 12 engages against a portion of the peripheral surface of the first, rearward tire 74 and the forward surface 18 of the first chock 12 engages against a portion of the peripheral surface of the first, forward tire 76. The second chock 12' is then positioned between a second, rearward tire 78 of the landing gear assembly 72 and a second, forward tire 82 of the landing gear assembly in substantially the same manner as the first chock 12. Although the second chock 12' is not visible in FIG. 9, the second chock 12' is positioned on portions of the peripheral surfaces of the second, rearward tire 78 and the second, forward tire 82 in substantially the same manner as the first chock 12 represented in FIG. 9.

The panel 14 of the platform 10 is then positioned on the top surfaces 26, 26' of the respective first chock 12 and second chock 12'. As the panel 14 is positioned on the first chock 12 and the second chock 12', the rails 62, 64 are removably positioned in the channels 28, 28', 32, 32' of the respective first chock 12 and second chock 12'. This holds the first chock 12, the second chock 12' and the panel 14 all stationary relative to each other. With the rails 62, 64 positioned in the channels 28, 28', 32', 32', the bottom surface 34 of the panel 14 rests on the top surfaces 26, 26' of the respective first chock 12 and second chock 12'. This mounts the platform 10 on to the landing gear assembly 72 where a worker, using a step ladder can step onto the top surface 36 of the panel 14 for performing work on the landing gear assembly 72 above the platform 10.

Figure 6:
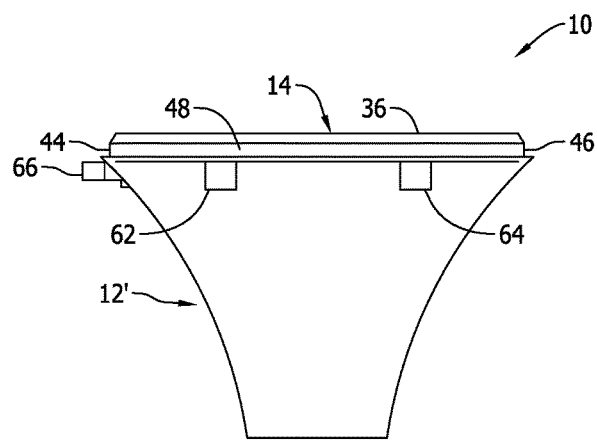
FIG. 6 is a representation of a side elevation view of the platform along the section line 6-6 of FIG. 2, with the opposite side elevation view of the platform being a mirror image thereof.

The panel 14 has a length dimension that enables the panel to extend across the landing gear assembly 72 between the first rearward and forward tires 74, 76 and the second rearward and forward tires 78, 82. However, the length of the panel 14 does not allow the panel to extend beyond the first rearward and forward tires 74, 76 and the second rearward and forward tires 78, 82. The panel 14 also has a width dimension that enables the panel 14 to span the gap between the first rearward and forward tires 74, 76 and the second rearward and forward tires 78, 82. However, as can be best seen in FIG. 6, the width dimension of the panel 14 is not larger but is actually smaller than a length dimension of the top surfaces 26, 26' of the respective first chock 12 and second chock 12' between the rearward surfaces 16, 16' and the forward surfaces 18, 18' of the two chocks 12, 12'. The length dimensions of the top surfaces 26, 26' of the respective first chock 12 and second chock 12' prevent the rearward edge portion 44 of the panel 14 and the forward edge portion 46 of the panel 14 from contacting the first rearward and forward tires 74, 76 and the second rearward and forward tires 78, 82 of the landing gear assembly 72 and potentially altering the tires 74, 76, 78, 82.

When the work on the landing gear assembly 72 is completed, the worker steps off of the panel 14 and the panel 14 is removed from the first chock 12 and the second chock 12'. The first chock 12 and the second chock 12' can then be removed from the landing gear assembly 72.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A landing gear platform comprising:
    a chock that is configured to fit and engage between a rearward tire of an aircraft landing gear and a forward tire of the aircraft landing gear, the chock having a top surface; and,
    a panel having a top surface and opposite bottom surface, the bottom surface of the panel being configured to be positioned over the top surface of the chock when the chock is fit and engaged between the rearward tire of the aircraft landing gear and the forward tire of the aircraft landing gear whereby the chock supports the top surface of the panel between the rearward tire of the aircraft landing gear and the forward tire of the aircraft landing gear where the top surface of the panel is accessible to an individual and is configured to support the individual above the rearward tire of the aircraft landing gear and the forward tire of the aircraft landing gear.

2. The landing gear platform of claim 1, further comprising:
    the chock and the panel are completely separate component parts and are not attached together.

3. The landing gear platform of claim 1, further comprising:
    the chock is constructed of a resilient material; and,
    the panel is constructed of a rigid material.

4. The landing gear platform of claim 1, further comprising:
    the chock having a wedge shaped configuration; and,
    the panel having a rectangular configuration, the top surface and bottom surface of the panel being flat and parallel.

5. The landing gear platform of claim 1, further comprising:
    the chock being a first chock of a pair of first and second separate chocks, the first chock being configured to fit and engage between an outboard, rearward tire of an aircraft landing gear and an outboard, forward tire of an aircraft landing gear, the first chock having a top surface;
    the second chock being configured to fit and engage between an inboard, rearward tire of the aircraft landing gear and an inboard, forward tire of the aircraft landing gear, the second chock having a top surface; and,
    the bottom surface of the panel being configured to be positioned over the top surface of the first chock and the top surface of the second chock when the first chock is fit and engaged between the outboard, rearward tire of the aircraft landing gear and the outboard, forward tire of the aircraft landing gear and when the second chock is fit and engaged between the inboard, rearward tire of the aircraft landing gear and the inboard, forward tire of the aircraft landing gear with the first chock and the second chock supporting the top surface of the panel between the outboard, rearward tire of the aircraft landing gear and the outboard, forward tire of the aircraft landing gear and between the inboard, rearward tire of the aircraft landing gear and the inboard, forward tire of the aircraft landing gear.

6. The landing gear platform of claim 5, further comprising:
    the first chock, the second chock and the panel being completely separate parts and not attached together.

7. The landing gear platform of claim 5, further comprising:
    the first chock having a first channel recessed into the top surface of the first chock and a second channel recessed into the top surface of the first chock;
    the second chock having a first channel recessed into the top surface of the second chock and a second channel recessed into the top surface of the second chock; and,
    the panel having a first rail on the bottom surface of the panel and a second rail on the bottom surface of the panel, the first rail being configured for insertion into the first channel in the top surface of the first chock and the first channel in the top surface of the second chock and the second rail being configured for insertion into the second channel in the top surface of the first chock and the second channel in the top surface of the second chock.

8. The landing gear platform of claim 5, further comprising:

a channel recessed into the top surface of the first chock; and, a rail projecting from the bottom surface of the panel, the rail being configured to be removably fit into the channel whereby the channel and the rail hold the first chock and the panel stationary relative to each other.

9. The landing gear platform of claim 8, further comprising:
a channel recessed into the top surface of the second chock; and,
a second rail projecting from the bottom surface of the panel, the second rail being configured to be removably fit into the channel in the top surface of the second chock whereby the channel in the top surface of the second chock and the second rail hold the second chock and the panel stationary relative to each other.

10. A landing gear platform comprising:
a chock, the chock having a rearward surface, the rearward surface being configured for engagement of the rearward surface against a portion of a peripheral surface of a rearward tire of an aircraft landing gear, the chock having a forward surface opposite the rearward surface, the forward surface being configured for engagement of the forward surface against a portion of a peripheral surface of a forward tire of the aircraft landing gear whereby the chock prevents the rearward tire of the aircraft landing gear and the forward tire of the aircraft landing gear from rotating, the chock having a top surface extending between the rearward surface and forward surface of the chock; and,
a panel having a top surface and an opposite bottom surface, the bottom surface of the panel being configured to be positioned over the top surface of the chock when the rearward surface of the chock is engaged against a rearward tire of an aircraft landing gear and the forward surface of the chock is engaged against a forward tire of the aircraft landing gear whereby the chock supports the top surface of the panel between the rearward tire of the aircraft landing gear and the forward tire of the aircraft landing gear where the top surface is accessible to an individual and is configured to support the individual above the rearward tire of the aircraft landing gear and the forward tire of the aircraft landing gear.

11. The landing gear platform of claim 10, further comprising:
the chock and the panel are completely separate component parts and are not attached together.

12. The landing gear platform of claim 10, further comprising:
the chock is constructed of a resilient material; and,
the panel is constructed of a rigid material.

13. The landing gear platform of claim 10, further comprising:
the chock having a wedge shaped configuration; and,
the panel having a rectangular configuration, the top surface and bottom surface of the panel being flat and parallel.

14. The landing gear platform of claim 10, further comprising:
the chock being a first chock of a pair of first and second separate chocks, the first chock having a rearward surface that is configured for engagement of the rearward surface against a portion of a peripheral surface of an outboard, rearward tire of an aircraft landing gear, the first chock having a forward surface opposite the rearward surface, the forward surface being configured for engagement of the forward surface against a portion of a peripheral surface of an outboard, forward tire of the aircraft landing gear, the first chock having a top surface;

the second chock having a rearward surface, the rearward surface of the second chock being configured for engagement of the rearward surface of the second chock against a portion of a peripheral surface of an inboard, rearward tire of the aircraft landing gear, the second chock having a forward surface opposite the rearward surface of the second chock, the forward surface of the second chock being configured for engagement of the forward surface of the second chock against a portion of a peripheral surface of an inboard, forward tire of the aircraft landing gear; and, the bottom surface of the panel being configured to be positioned over the top surface of the first chock and the top surface of the second chock when the rearward surface of the first chock is engaging against a portion of a peripheral surface of an outboard, rearward tire of the aircraft landing gear and the forward surface of the first chock is engaging against a portion of a peripheral surface of an outboard, forward tire of the aircraft landing gear and when the rearward surface of the second chock is engaging against a portion of a peripheral surface of an inboard, rearward tire of the aircraft landing gear and the forward surface of the second chock is engaging against a portion of a peripheral surface of an inboard, forward tire of the aircraft landing gear with the first chock and the second chock supporting the top surface of the panel between the outboard, rearward tire of the aircraft landing gear and the outboard, forward tire of the aircraft landing gear and between the inboard, rearward tire of the aircraft landing gear and the inboard, forward tire of the aircraft landing gear.

15. The landing gear platform of claim 14, further comprising:
the first chock, the second chock and the panel being completely separate component parts and not attached together.

16. The landing gear platform of claim 14, further comprising:
the first chock having a first channel recessed into the top surface of the first chock and a second channel recessed into the top surface of the first chock;
the second chock having a first channel recessed into the top surface of the second chock and a second channel recessed into the top surface of the second chock; and,
the panel having a first rail on the bottom surface of the panel and a second rail on the bottom surface of the panel, the first rail being configured for insertion into the first channel in the top surface of the first chock and the first channel in the top surface of the second chock and the second rail being configured for insertion into the second channel in the top surface of the first chock and the second channel in the top surface of the second chock.

17. The landing gear platform of claim 14, further comprising:
a channel recessed into the top surface of the first chock; and,
a rail projecting from the bottom surface of the panel, the rail being configured to be removably fit into the channel whereby the channel and the rail hold the first chock and the panel stationary relative to each other.

18. The landing gear platform of claim 17, further comprising:
- a channel recessed into the top surface of the second chock; and,
- a second rail projecting from the bottom surface of the panel, the second rail being configured to be removably fit into the channel in the top surface of the second chock whereby the channel in the top surface of the second chock and the second rail hold the second chock and the panel stationary relative to each other.

19. A method of providing a support surface for a worker above an aircraft landing gear, the method comprising:
- positioning a chock between a rearward tire of the aircraft landing gear and a forward tire of the aircraft landing gear; and,
- positioning a platform on the chock.

20. The method of claim 19, further comprising:
- positioning the chock between an outboard, rearward tire of the aircraft landing gear and an outboard, forward tire of the aircraft landing gear;
- positioning a second chock between an inboard, rearward tire of the aircraft landing gear and an inboard, forward tire of the aircraft landing gear; and,
- positioning the panel over the chock and the second chock.

* * * * *